United States Patent
Hild et al.

[11] Patent Number: 5,916,138
[45] Date of Patent: Jun. 29, 1999

[54] HYDROSTATIC TRANSMISSION

[75] Inventors: Berthold Hild, Burbach; Helmut Stötzel, Hilchenbach, both of Germany

[73] Assignee: SMS Schloemann-Siemag Aktiengesellschaft, Dusseldorf, Germany

[21] Appl. No.: 08/963,699

[22] Filed: Nov. 4, 1997

[30]     Foreign Application Priority Data

Nov. 6, 1996 [DE] Germany .......................... 196 45 699

[51] Int. Cl.⁶ ................................................ F16H 39/02
[52] U.S. Cl. .................... 60/327; 60/443; 60/453
[58] Field of Search ............... 60/443, 444, 327, 60/452, 464, 465, 453, 454

[56]         References Cited

U.S. PATENT DOCUMENTS

| | | | |
|---|---|---|---|
| 4,368,798 | 1/1983 | Meyerle et al. ...................... 60/444 X |
| 4,528,813 | 7/1985 | Izumi et al. ............................ 60/444 X |
| 5,211,015 | 5/1993 | Schroeder .................................. 60/444 |
| 5,493,860 | 2/1996 | Bjerke et al. .............................. 60/327 |

FOREIGN PATENT DOCUMENTS 4422424  1/1996  Germany .
55-19904  2/1980  Japan ........................................ 60/444
57-143180  9/1982  Japan ........................................ 60/444
57-129959  8/1992  Japan ........................................ 60/444

*Primary Examiner*—John E. Ryznic
*Attorney, Agent, or Firm*—Friedrich Kueffner

[57]           ABSTRACT

A hydrostatic transmission with a closed hydraulic circuit includes a consumer which is connected through work lines to a reversible hydraulic pump and is pressurized on both sides by an external pressure source. The hydraulic circuit includes a first continuous rinsing and feeding circuit which depends on the leakage flow of the hydraulic pump and possibly a second discontinuous rinsing circuit separate from the first circuit and connected to the external pressure source. The hydrostatic transmission further includes an adjustable regulating device which determines through a valve the adjustment of the hydraulic pump. The regulating device, which may be arranged outside of the immediate vicinity of the hydrostatic transmission, interacts with a control device which is directly assigned to the hydrostatic transmission and includes a valve constructed as a servo valve, wherein, for adjusting the arrangement, the servo valve can be switched to manual control. A manually operable lock valve is provided between the servo valve and the hydraulic pump adjustment. The throttles used for pressurization are adjustable as well as lockable and the work lines are equipped with pick-ups for the actual pressure value.

10 Claims, 1 Drawing Sheet

HYDROSTATIC TRANSMISSION

BACKGROUND OF THE INVENTION

1. Field of the Invention

The present invention relates to a hydrostatic transmission with a closed hydraulic circuit which includes a consumer which is connected through work lines to a reversible hydraulic pump and is pressurized on both sides by an external pressure source. The hydraulic circuit includes a first continuous rinsing and feeding circuit which depends on the leakage flow of the hydraulic pump and possibly a second discontinuous rinsing circuit separate from the first circuit and connected to the external pressure source. The hydrostatic transmission further includes an adjustable regulating device which determines through a valve the adjustment of the hydraulic pump.

2. Description of the Related Art

A hydraulic pump of the above-described type is disclosed by DE 44 22 424 A1. However, it has been found that, due to tolerances of the hydraulic and electronic components of the hydrostatic transmission according to the prior art and also due to different wear in the nozzles and gaps, irregularities occur which make it impossible to carry out an exact reproducible operation of the hydrostatic transmission. In addition, due to errors, for example, errors of pick-ups for determining the actual value of a travel distance of the hydrostatic transmission, signals are falsified or not produced at all, so that the hydrostatic transmission may be damaged or destroyed.

SUMMARY OF THE INVENTION

Therefore, it is the primary object of the present invention to further develop a hydrostatic transmission of the above-described type in such a way that an exact reproducible operation of the transmission is possible, wherein overloading of the system is to be excluded.

In accordance with the present invention, the regulating device, which may be arranged outside of the immediate vicinity of the hydrostatic transmission, interacts with a control device which is directly assigned to the hydrostatic transmission and includes a valve constructed as a servo valve, wherein, for adjusting the arrangement, the servo valve can be switched to manual control. A manually operable lock valve is provided between the servo valve and the hydraulic pump adjustment means. The throttles used for pressurization are adjustable as well as lockable and the work lines are equipped with pressure sensors for the actual pressure value.

By using the servo valve, the adjustment of the hydraulic pump can be adjusted more exactly. For adjusting the individual components of the hydrostatic transmission, the servo valve can be precisely manually actuated in order to adjust the hydraulic pump to the feeding quantity "zero". For this purpose, the throttles must be locked. The pressure sensors for the actual pressure value in the work lines signalize the "zero value" of the feeding quantity when both pressure sensors for the actual pressure values produce equal values. The throttles as well as the servo valve are also adjustable.

When the signals picked up by the pressure sensors are supplied to a regulating device serving for overload protection, the regulating device can compare these actual values of the pressure sensors with predetermined desired or intended values and can switch the hydrostatic transmission on or off in order to prevent damage or destruction.

By using a common control device with appropriate indicating devices, the adjusting procedure of the individual components as well as the measures for the overload protection can be controlled and operated.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
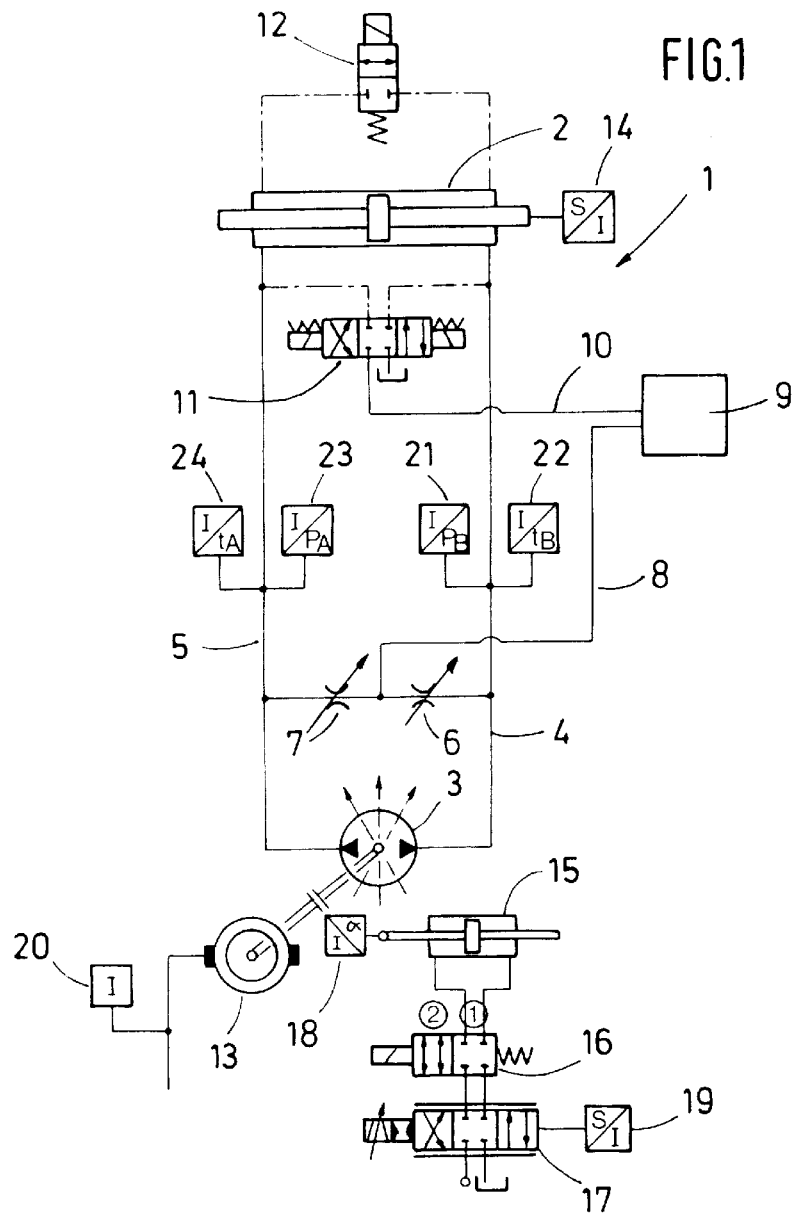
FIG. 1 is a diagram showing the hydrostatic transmission according to the present invention with a consumer.

FIG. 1 of the drawing shows a hydrostatic transmission 1 which together with a consumer 2 forms a closed hydraulic circuit. The hydrostatic transmission 1 is composed of a hydraulic pump 3 which is connected through work lines 4, 5 to the consumer 2. The hydrostatic transmission 1 can be pressurized through adjustable and/or lockable throttles 6, 7. A supply line 8 is connected between the throttles 6, 7, wherein the supply line 8 connects the throttles 6, 7 to an external pressure medium source 9. In addition, the pressure medium source 9 is connected through a line 10 to a 4/3-way valve 11 by means of which the hydraulic circuit can be rinsed discontinuously, while a continuous rinsing of the hydraulic circuit is carried out through the line 8 and the throttles 6, 7, so that leakage of the system can be regularly compensated. A bypass valve 12 connected in parallel to the consumer 2 can also be actuated electrically for protecting the consumer 2. The hydraulic pump 3 is driven through a motor 13. An actual distance value distance sensor 14 is assigned to the consumer 2.

The hydraulic pump 3 is adjustable by means of a pump adjusting cylinder 15. The pump adjusting cylinder 15 is connected through a lock valve 16 to a servo valve 17 and has an actual angle value angle sensor 18, while an actual distance value displacement sensor 19 is assigned to the servo valve 17. The current flowing through the motor 13 is determined by a current meter 20. An actual pressure value pressure sensor 21 as well as an actual temperature value temperature sensor 22 are assigned to the work line 4. Analogously, the work line 5 has an actual pressure value pressure sensor 23 and an actual temperature value temperature sensor 24.

Figure 2:
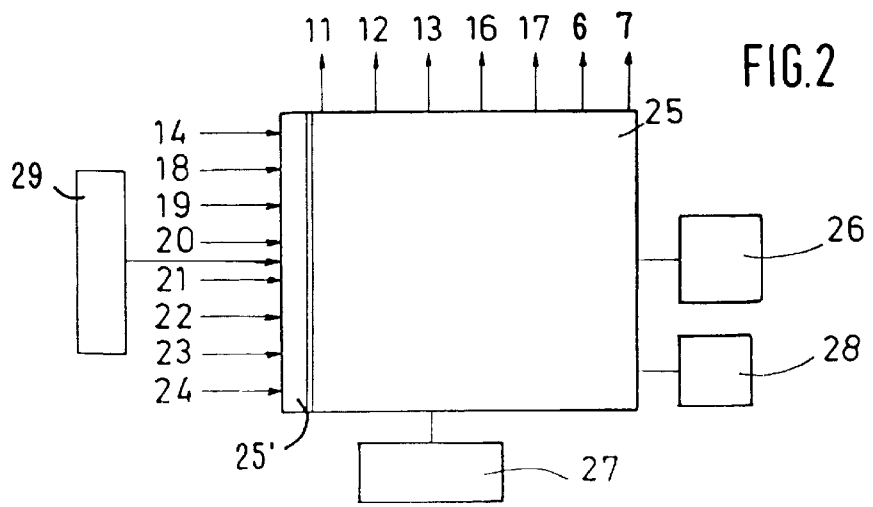
FIG. 2 is a schematic illustration of the control device for the hydrostatic transmission.

The actual value signals of the afore-mentioned sensors 14, 18, 19, 21–24 and of the current meter 20 are supplied to a control device 25 in accordance with FIG. 2. Desired values can be fed into the control device 25 through an input unit. However, determined actual values can also serve as advanced desired values. Outputs of the control device 25 are connected to the 4/3-way valve 11, the bypass valve 12, the motor 13, the lock valve 16 as well as the servo valve 17. Additional outputs of the control device 25 are connected to the adjustable throttles 6 and 7, such that the throttles 6 and 7 can be manually controlled through the input unit 26. The control device 25 includes a monitoring device 25' in which the actual values 14 and 18–24 are compared to desired values provided by an advanced desired value unit 29.

The determined actual values are compared in the control device 25 to the given desired values. When one of the desired values with respect to pressure, angle or temperature is exceeded by the corresponding actual values, at least one of the valves 11, 12, 16, 17 and/or the motor 13 is switched off or over through the outputs or is placed in such a position that the overloading is counteracted.

The adjustment of the individual elements is carried out as follows: the regulating device, not shown, for the normal operation of the hydrostatic transmission is switched off through the control device 25. The throttles 6, 7 are closed. The lock valve 16 and the servo valve 17 are switched over to manual operation by the control device 25, wherein the lock valve 16 is switched into the opened state. By shifting the servo valve 17, the pump adjusting cylinder 15, and, thus the adjustment of the hydraulic pump 3 are changed until the actual pressure value pick-ups 21, 23 indicate equal pressure. Consequently, equal pressures exist in the work lines 4 and 5, and the hydraulic pump 3 feeds, if at, equal amounts of pressure medium in both directions. This position corresponds to the pump position "zero". The corresponding angle measured by the angle sensor 18 is supplied to the control device 25 as a pump zero position or a zero angle and is stored. The adjustment of the hydraulic pump 3 is now concluded.

For adjusting the throttles 6, 7, the hydraulic pump 3 is held in the determined pump zero position through the lock valve 16. The lock valve 16 is locked for this purpose. The hydraulic circuit is then fed from the pressure medium source 9 through the feeding line 8 to the throttles 6, 7, wherein the throttles 6, 7 are adjusted in such a way that again the actual pressure value pressure sensors 21, 23 indicate equal pressure values. In this position which guarantees the equal pressure values, the throttles are adjusted and secured.

At the end, the servo valve 17 is to be adjusted. For this purpose, the lock valve 16 is opened and the servo valve 17 is manually shifted until the actual angle value sensor 18 of the pump adjusting cylinder 15 signalizes the previously stored zero angle position. This zero position of the servo valve is also stored as a reference value in the control device 25 and possibly also in the regulating device, not shown.

The control device 25 includes indicating units 27 for indicating the actual pressure values, the desired pressure values, the difference between the actual pressure values and the desired pressure values as well as the difference of the measured actual pressure values of both pressure sensors 21, 23. The values with respect to distance, pressure, angle and current of the remaining actual value sensors and the corresponding desired values can also be indicated on the indicating unit. The hydrostatic transmission can be controlled manually and can be appropriately adjusted by means of the input unit 26 and/or an operating unit 28.

After the hydrostatic transmission has been adjusted, the regulating device is again activated by the control device 25. The control device 25 now acts as overload protection.

For this purpose, the desired values and the actual values supplied to the control device 25 are compared to each other and, when at least one of the given desired values is exceeded, the hydrostatic transmission 1 is switched off or over by the control device 25.

While specific embodiments of the invention have been shown and described in detail to illustrate the inventive principles, it will be understood that the invention may be embodied otherwise without departing from such principles.

We claim:

1. A hydrostatic transmission comprising a closed hydraulic circuit including a consumer having two sides, a reversible hydraulic pump and work lines connecting the reversible hydraulic pump to the consumer, an external pressure source for pressurizing the consumer on both sides thereof, the hydraulic circuit comprising a first continuous rinsing and feeding circuit in dependence on a leakage flow of the hydraulic pump, an adjustable regulating device comprising a valve for adjusting a hydraulic pump, further comprising a control device directly assigned to the hydrostatic transmission and interacting with the regulating device, the control device comprising the valve configured as a servo valve, the control device comprising means for switching the servo valve to manual control, a manually operated lock valve connected between the servo valve and the hydraulic pump adjustment, further comprising adjustable and closable throttles for effecting the pressurization, wherein the work lines comprise actual pressure value pressure sensors.

2. The hydrostatic transmission according to claim 1, further comprising a second discontinuous rinsing circuit separate from the first circuit and connected to the external pressure source.

3. The hydrostatic transmission according to claim 1, wherein the regulating device is mounted outside an immediate vicinity of the hydrostatic transmission.

4. The hydrostatic transmission according to claim 1, comprising adjustment members for manually controlling the servo valve and the throttles and for locking the lock valve, wherein the actual pressure value pressure sensors comprise display devices, and wherein the adjusting members and the display devices are combined in the control device.

5. The hydrostatic transmission according to claim 4, wherein the control device further comprises a display and evaluating arrangement for determining output values of actual distance value distance sensors of at least one of the consumer and the servo valve, for determining output values of actual angle value angle sensors of the hydraulic pump, for determining output values of actual temperature value temperature sensors for determining pressure medium temperatures and for determining output values of pick-ups determining a current consumption of a drive motor of the hydraulic pump, and for displaying and/or evaluating the values determined by the sensors.

6. The hydrostatic transmission according to claim 1, wherein the control device is configured for receiving the output values of the sensors for comparing the output values to predetermined desired values for the respective pick-ups, and for switching the hydrostatic transmission when at least one of the desired values is exceeded.

7. The hydrostatic transmission according to claim 6, wherein the monitoring device comprises means for switching off the hydrostatic transmission with delay, wherein a delay interval adjustably depends on the degree of exceeding the predetermined value.

8. A method of adjusting to zero hydraulic pumps of a hydrostatic transmission including a closed hydraulic circuit with a consumer having two sides, a reversible hydraulic pump and work lines connecting the reversible hydraulic pump to the consumer, an external pressure source for pressurizing the consumer on both sides thereof, the hydraulic circuit including a first continuous rinsing and feeding circuit in dependence on a leakage flow of the hydraulic pump, an adjustable regulating device including a valve for determining a hydraulic pump adjustment, and a control device directly assigned to the hydrostatic transmission and interacting with the regulating device, the control device including the valve configured as a servo valve, the control device including means for switching the servo valve to manual control, a manually operated lock valve connected between the servo valve and the hydraulic pump adjustment, further including adjustable and lockable throttles for effecting the pressurization, wherein the work lines have actual pressure value pick-ups, the method comprising manually locking the throttles, manually adjusting the servo valve until pressure values of the pressure pick-ups of the work lines are equal, and determining an adjusting angle of the hydraulic pump corresponding to a zero conveying quantity.

9. The method according to claim 8, for synchronizing the pressurization of the consumer, comprising, when the conveying quantity is adjusted to zero and the hydraulic pump is locked for the adjusting procedure, supplying pressure medium to the throttles effecting an initial pressurization, and carrying out an adjustment of the throttles which ensures equal pressure values of the pressure pick-ups of the work lines.

10. The method according to claim 4, comprising manually adjusting the servo valve until at least the conveying quantity of the hydraulic pump has reached zero, until equal pressure values of the actual pressure value pick-ups of the work lines have been reached, and until a stored angle of the actual angle value pick-up of a pump adjusting cylinder corresponds to the zero value of conveying, storing the manually adjusted position of the servo valve and supplying the position as zero adjustment to the control device.

* * * * *